United States Patent Office 3,252,771
Patented May 24, 1966

3,252,771
HYDROCARBON FUEL COMPOSITIONS
Thomas J. Clough, Blue Island, and David W. Young, Homewood, Ill., assignors to Sinclair Research, Inc., Wilmington, Del., a corporation of Delaware
No Drawing. Filed Feb. 19, 1962, Ser. No. 174,302
5 Claims. (Cl. 44—62)

This invention relates to hydrocarbon fuel compositions having improved pour points.

It is known in the art to add pour depressors to hydrocarbon fuels in order to permit their flow at low temperatures. Many different types of materials are known to depress the pour point of hydrocarbon fuels but most have to be employed in disadvantageously large concentrations to provide the desired results.

We have now found that polymerization products of normal alpha-olefins of 16 to 18 carbon atoms when added in small amounts to hydrocarbon fuel oils substantially reduce the pour point of the oils and in many cases also reduce their cloud point. In a most practical embodiment the additive of the present invention is the polymerization product of a mixture of alpha-olefins selected from normal $C_{10}$ to $C_{26}$ alpha-olefins that predominates in normal $C_{16}$ to $C_{18}$ alpha-olefins, preferably normal $C_{16}$ alpha-olefins.

The polymerization product of the present invention can be prepared by polymerizing the alpha-olefin at a temperature of about $-10°$ C. to $100°$ C., preferably about $0°$ to $50°$ C. in the presence of a Friedel-Crafts catalyst. It is preferred that an inert diluent for the catalyst be also employed and when used will generally be present in an amount of about 0.5 to 5 volumes of diluent per volume of the mixed alpha-olefin feed. Suitable inert diluents are for instance, alkanes of 3 to 8 carbon atoms such as propane, butane, pentane, hexane as well as lower alkyl halides of 1 to 4 carbon atoms such as methyl chloride, ethyl chloride and the like. The preferred catalyst is a solution of aluminum chloride in ethyl chloride or methyl chloride using a concentration of about .5 to 5% by weight of catalyst in the catalyst solution and the total amount of aluminum chloride employed is generally about 0.1 to 15% by weight per 100 parts of the polymer formed.

After the polymerization has been effected, either by batch or continuous operation, the resulting polymer can be separated from residual catalyst as by washing with water, alcohol, dilute aqueous caustic soda or other suitable hydrolyzing and washing methods. The polymerization product is a light-colored, viscous oil having a Staudinger molecular weight of about 1,000 to 20,000.

As aforementioned, the additive of the present invention is the polymerizate of a normal $C_{16}$ to $C_{18}$ alpha-olefin or mixtures thereof. Alternatively, the additive can be the polymerizate of a mixture of two or more normal alpha-olefins having 10 to 26 carbon atoms, preferably 12 to 20 carbon atoms, wherein the mixture selected includes a normal $C_{16}$ to $C_{18}$ alpha-olefin or mixtures thereof in predominating proportions as to any other olefin. The normal $C_{16}$ alpha-olefin is particularly preferred. Polymerization products of higher alpha-olefins than the select $C_{16}$ to $C_{18}$ alpha-olefins or products of mixtures that do not include the $C_{16}$ to $C_{18}$ alpha-olefins in predominating amounts have been found ineffectual as pour depressors. Generally, it is preferred that the percentage of $C_{16}$ to $C_{18}$ alpha-olefin in a selected mixture be at least about 30% by weight, preferably at least about 60%, and can constitute up to 99% or more by weight of the total mixed alpha-olefin feed. If desired, the olefin feed may be entirely $C_{16}$, $C_{18}$ or their mixture.

The fuel oils which are improved in accordance with this invention are hydrocarbon fractions boiling primarily in the range of about $300°$ to $750°$ F. Such fuel oils are generally known as distillate fuel oils. It must be understood, however, that this term is not restricted to straight run distillates. These fuels can be straight run distillate fuel oils, catalytically or thermally cracked distillate fuel oils or mixtures of straight run distillate fuel oils, naphthas and the like with cracked distillate stocks. The cracked materials will frequently be about 15 to 70 volume percent of the fuel. Moreover, such fuel oils can be treated in accordance with well-known commercial methods such as acid or caustic treatment, solvent refining, clay treatment, etc.

The polymerization product of the present invention can be incorporated in the fuel oil by simply blending with stirring at ordinary temperature or, if desired, a mixture of the fuel and the polymerization product can be heated to elevated temperatures, e.g., 100 to $130°$ C. with agitation. The polymerization product is added to the fuel oils in small amounts sufficient to reduce the pour point and often sufficient to reduce cloud point. The actual amounts added are dependent on the particular fuel oil and polymerization product employed but generally will fall in the range of about .01 to 1% by weight or more, preferably about 0.1 to 0.5%.

The following examples are included to further illustrate the present invention.

Example I

A reaction flask was charged with 100 gms. of a mixture of 4% $C_{14}$ alpha-olefin, 90% $C_{16}$ alpha-olefin and 6% $C_{18}$ alpha-olefin at $27°$ C. To the reactants was added in a continuous stream 200 ml. of a saturated solution of $AlCl_3$ in ethyl chloride at $12°$ C. A vigorous reaction took place after the addition of 50 ml. of catalyst solution. The temperature increased to $35°$ C. and the remainder of the catalyst solution was added. The total time for the addition of the catalyst was four minutes, and the reaction was continued for an additional 6 minutes. The reaction was quenched with isopropyl alcohol, and the polymer washed with an isopropyl alcohol water mixture. The product, a viscous yellow polymer, was stripped of solvent material under a 1 mm. vacuum and blended in various concentrations with a No. 2 fuel. No. 2 fuel oil is a distillate fuel oil composed of 50 volume percent water white distillate having an end point of 565 and 50 volume percent light cycle oil derived by catalytic cracking of gas oil. The pour and cloud points of the blends were then determined. For comparison the pour and cloud points of the base fuel were also determined. The results are shown below:

| Percent polymer | Pour point, °F. | Cloud point, °F. |
|---|---|---|
| 0.50 | −55 | −2 |
| 0.25 | −20 | −2 |
| 0.10 | −10 | −2 |
| 0.05 | −5 | +4 |
| 0.00 | 0 | +8 |

Example II 100 grams of reactants of approximate composition:

| | Percent |
|---|---|
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 | were added to a reaction flask at $25°$ C. To the reactants was added 250 ml. of a saturated solution of $AlCl_3$ in ethyl chloride, and a vigorous reaction took place after the addition of approximately 50 ml. of catalyst. The total time for the addition of catalyst was 4 minutes and the reaction was continued for an additional 6 minutes. The reaction was quenched in isopropyl alcohol, and the polymer separated from the alcohol layer. The polymer was washed and stripped of solvents. A viscous yellow polymer was obtained which was blended in No. 2 fuel oil in various concentrations. The cloud and pour points of the blends and base fuel were determined. The results were as follows:

| Percent polymer | Pour point, °F. | Cloud point, °F. |
| --- | --- | --- |
| 0.50 | 1 −80 | +2 |
| 0.25 | 1 −80 | +8 |
| 0.10 | −40 | +8 |
| 0.05 | −15 | +8 |
| 0.025 | −5 | +8 |
| 0.00 | 0 | +8 |

1 Below.

*Example III*

A reaction flask was charged with 125 grams of a mixture of alpha-olefins of approximate composition:

|  | Percent |
| --- | --- |
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 |

Dry Ice was added to a temperature of 12° C. To the reactants was added 150 ml. of a saturated $AlCl_3$ in ethyl chloride solution and the temperature increased to 26° C. This temperature was maintained during the addition of the remaining catalyst solution. The total time for addition of the catalyst was 5 minutes, and the reaction was continued for an additional 55 minutes. The reaction was quenched in isopropyl alcohol, and the polymer separated from the alcohol layer by the addition of $H_2O$. The polymer was washed and stripped of all solvents. The polymer had a S.U.V. of 187.4 seconds at 210° F. and a gravity of 0.8544.

The polymer was blended in various concentrations with No. 2 fuel oil for pour and cloud reduction. The results on the base fuel and blends was as follows:

| Percent polymer material in fuel oil | Pour point, °F. | Cloud point, °F. |
| --- | --- | --- |
| 0.50 | −60 | +2 |
| 0.25 | −45 | +2 |
| 0.10 | −5 | +6 |
| 0.05 | −5 | +4 |
| 0.00 | 0 | +8 |

The data of Examples I to III clearly demonstrate the pour and cloud point reducing properties of the polymerization product of the present invention.

Example IV is included to demonstrate that polymerization products of long chain alpha-olefin mixtures not predominating in $C_{16}$–$C_{18}$ alpha-olefins do not provide an additive having effective pour and cloud reducing properties.

*Example IV*

100 grams of a mixture of alpha-olefins of an approximate composition:

|  | Percent |
| --- | --- |
| $C_{18}$ alpha-olefin | 15 |
| $C_{20}$ alpha-olefin | 50 |
| $C_{22}$ alpha-olefin | 35 | and 150 ml. of N-hexane at 45° C. was added to a reaction flask. To this mixture was added, in a continuous stream, 200 ml. of a saturated catalyst solution of $AlCl_3$ in ethyl chloride at 12° C. A vigorous reaction took place with the temperature remaining constant at 45° C. The total time for the addition of the catalyst was 3 minutes, and the reaction was continued for an additional 7 minutes. The reaction was quenched in isopropyl alcohol, and the polymer washed and stripped of solvent material. The polymer was yellow and a solid at 27° C. The polymer was blended in fuel oil for pour and cloud reduction, and data are given in the table below:

| Percent polymer | Pour point, °F. | Cloud point, °F. |
| --- | --- | --- |
| 0.50 | +5 | +10 |
| 0.25 | +5 | +8 |
| 0.10 | −5 | +8 |
| 0.05 | 0 | +8 |
| 0.00 | 0 | +8 |

*Example V*

100 grams of reactants of approximate compositions:

|  | Percent |
| --- | --- |
| $C_{12}$ adpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 | were added to a reaction flask at 25° C. To the reactants was added 5 gms. of $AlCl_3$ and a trace amount of $H_2O$. Upon mixing, the temperature increased to 95° C. and the reaction was quenched in isopropyl alcohol after 5 minutes. The polymer was washed and stripped of solvents. The polymer had a S.U.V. of 152.5 seconds at 210° F. The polymer was blended in No. 2 fuel oil for pour and cloud point reduction and the results are shown below.

| Percent polymer | Pour point, °F. | Cloud point, °F. |
| --- | --- | --- |
| 0.25 | −40 | +2 |
| 0.10 | −10 | +8 |
| 0.00 | 0 | +6 |

*Example VI*

100 grams of reactants of approximate composition.

|  | Percent |
| --- | --- |
| $C_{12}$ alpha-olefin | 7 |
| $C_{14}$ alpha-olefin | 16 |
| $C_{16}$ alpha-olefin | 40 |
| $C_{18}$ alpha olefin | 30 |
| $C_{20}$ alpha-olefin | 7 | were added to a reaction flask at 25° C. 4.9 gms. of $AlCl_3$ and 3.2 gms. of tertiarybutyl chloride were added, and the temperature increased to 92° C. The reaction was quenched with isopropyl alcohol after 5 minutes, and the polymer washed with $H_2O$. After distillation, the polymer had a S.U.V. of 92.1 seconds. The polymer was blended in No. 2 fuel oil for pour and cloud point reduction and the results are shown below:

| Percent polymer material in fuel oil | Pour point, °F. | Cloud point, °F. |
| --- | --- | --- |
| 0.25 | −45 | +4 |
| 0.10 | −15 | +6 |
| 0.00 | 0 | +6 |

Example VII

A reaction flask was charged with 200 gms. of a mixture of alpha-olefins of composition:

| | Percent |
|---|---|
| $C_{14}$ alpha-olefin | 4 |
| $C_{16}$ alpha-olefin | 90 |
| $C_{18}$ alpha-olefin | 6 |

2.5 gms. of $AlCl_3$ and 1.6 gms. of tertiarybutyl chloride at 25° C. The temperature increased to 44° C. and was held at this temperature for 15 minutes. The reaction was continued for an additional 15 minutes and was then quenched with isopropyl alcohol. The polymer was washed and distilled. The polymer had a S.U.V. of 110.5 at 210° F. and was blended in No. 2 fuel oil at various concentrations. The pour and cloud points of the resulting blends are shown below:

| Percent polymer | Pour point, °F. | Cloud point, °F. |
|---|---|---|
| 0.25 | −40 | 0 |
| 0.10 | −10 | +6 |
| 0.00 | 0 | +6 |

Example VIII

A reaction flask was charged with 100 gms. of a mixture of alpha-olefins of approximate composition:

| | Percent |
|---|---|
| $C_{14}$ alpha-olefin | 4 |
| $C_{16}$ alpha-olefin | 90 |
| $C_{18}$ alpha-olefin | 6 | at 25° C. 1.5 gms. of $AlCl_3$ and 1.2 gms. of tertiarybutyl chloride were added. The temperature increased to 50° C. and an additional 100 gms. of olefins were added at such a rate as to maintain the temperature at 50° C. Upon addition of the olefins, the temperature increased to 75° C. The reaction was continued for a total reaction time of 30 minutes. The polymer solution was quenched with isopropyl alcohol, and the polymer was washed and stripped of solvents. The polymer had a S.U.V. of 117.9 seconds at 210° F., and was blended in fuel oil at various concentrations for pour reduction. The results were as follows:

| Percent polymer material in fuel oil | Pour point, °F. | Cloud point, °F. |
|---|---|---|
| 0.25 | −40 | +6 |
| 0.10 | −15 | +10 |
| 0.00 | 0 | +6 |

Example IX

To a reaction flask was added 150 gms. of a mixture of alpha-olefins of approximate composition:

| | Percent |
|---|---|
| $C_{14}$ alpha-olefin | 4 |
| $C_{16}$ alpha-olefin | 90 |
| $C_{18}$ alpha-olefin | 6 | at 25° C. 80 ml. of a saturated $AlCl_3$ in ethyl chloride at 5° C. was added in 30 seconds to the olefins. The temperature increased to 48° C., and ethyl chloride was evolved. The reaction time was 5 minutes, and the polymer solution was quenched with isopropyl alcohol. The polymer was washed and distilled of solvent material. The polymer was blended in No. 2 fuel oil for pour reduction and cloud reduction. The results were as follows:

| Percent polymer | Pour point, °F. | Cloud point, °F. |
|---|---|---|
| 0.25 | −45 | 0 |
| 0.10 | −20 | 0 |
| 0.00 | 0 | +6 |

Example X

The polymerization of a mixture of alpha-olefins of approximate composition:

| | Percent |
|---|---|
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 | was carried out in the same manner as in Example IX. The results were as follows:

| Percent polymer material in fuel oil | Pour point, °F. | Cloud point, °F. |
|---|---|---|
| 0.25 | −45 | +8 |
| 0.10 | −10 | +6 |
| 0.00 | 0 | +6 |

Example XI

A reaction flask was charged with 60 gms. of 1-octadecene, and 36 ml. of a saturated $AlCl_3$ in ethyl chloride at 12° C. was added. The temperature increased to 50° C. and gradually decreased to 33° C. At this temperature the reaction was quenched in isopropyl alcohol, and the polymer washed and stripped of solvents. The polymer had a S.U.V. of 141.4 at 210° F. and was blended in No. 2 fuel oil in various concentrations for pour reduction.

| Percent polymer material in fuel oil | Pour point, °F. | Cloud point, °F. |
|---|---|---|
| 0.25 | −45 | +4 |
| 0.10 | −15 | +10 |
| 0.00 | 0 | +6 |

Example XII

The polymerization of a mixture of alpha-olefins of approximate composition:

| | Percent |
|---|---|
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 | was carried out using a saturated solution of $AlCl_3$ in ethyl chloride at 12° C. 150 ml. of the mixture of alpha-olefins and 150 ml. of the catalyst solution were added drop-wise into a reaction flask at a rate of approximately 100 ml. per minute for both catalyst and alpha-olefins. The temperature of polymerization during the entire addition was 20° C. and the reaction was continued for 10 minutes after the complete addition of the reactants and catalyst. The polymer was quenched in isopropyl alcohol and washed with $H_2O$. The polymer had a kinematic viscosity of 1279.8 at 100° F. and 83.27 at 210° F.

The polymer was blended in No. 2 fuel oil for pour and cloud reduction and results were as follows:

| Percent polymer | Pour point, °F. | Cloud point, °F. |
|---|---|---|
| 0.25 | −70 | +2 |
| 0.10 | −20 | +8 |
| 0.05 | −10 | +10 |
| 0.025 | −10 | +10 |
| 0.00 | −5 | +12 |

*Example XIII*

A mixture of alpha-olefins of approximate composition:

| | Percent |
|---|---|
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 | were polymerized using a saturated $AlCl_3$ in ethyl chloride solution at 12° C. 150 ml. of the olefins at 25° C. and 180 ml. of catalyst solution were added dropwise to a reaction flask at a rate of approximately 20 ml./minute. The reaction was continued for 10 minutes after the complete addition of olefin and catalyst. The reaction was quenched in isopropyl alcohol and a viscous material precipitated. The polymer was washed with $H_2O$ and stripped of solvents. The polymer was blended in fuel oil for pour and cloud reduction.

| Percent polymer | Pour point, °F. | Cloud point, °F. |
|---|---|---|
| 0.25 | −70 | +4 |
| 0.10 | −25 | +8 |
| 0.05 | −10 | +8 |
| 0.025 | −10 | +12 |
| 0.00 | −5 | +12 |

*Example XIV*

150 gms. of isobutylene, 230 ml. of N-hexane, were added to a Dewar flask with powdered Dry Ice. The temperature was adjusted to −25° C. 150 ml. of saturated $AlCl_3$ in ethyl chloride at +12° C. was added in a continuous stream. The temperature increased to −10° C. and this temperature was held throughout the addition of the catalyst. The time required for the addition of the catalyst was 8 minutes, and the reaction was continued for an additional 52 minutes. The reaction was quenched in isopropyl alcohol and the polymer material was separated from the alcohol layer. After the polymer was washed and steam stripped of solvents, it was blended in fuel oil. The polymer was viscous and had a S.U.V. of 170.3 at 210° F. and a gravity of 0.8715. The table below lists pour point and cloud point data for blends of this polymer in No. 2 fuel oil:

| Percent polymer | Pour point, °F. | Cloud point, °F. |
|---|---|---|
| 0.50 | −5 | +4 |
| 0.25 | −5 | +4 |
| 0.10 | −5 | +4 |
| 0.00 | −5 | +6 |

The data of this example demonstrate that polymers of low molecular weight alpha-olefins are not effective pour depressors.

We claim:
1. A fuel oil composition of improved pour point consisting essentially of a distillate hydrocarbon fuel oil and a small effective amount of an oil-soluble polymer of a normal $C_{16}$ to $C_{18}$ hydrocarbon alpha-olefin, said polymerization product having a molecular weight of about 1000 to 20,000, said amount being sufficient to reduce the pour point of the hydrocarbon fuel oil.

2. A fuel oil composition of improved pour point consisting essentially of a distillate hydrocarbon fuel oil and a small effective amount of an oil-soluble polymer of a mixture of alpha-olefins selected from normal $C_{10}$ to $C_{26}$ hydrocarbon alpho-olefins, said mixture containing at least about 30 up to 99 weight percent of and predominating in normal $C_{16}$ to $C_{18}$ hydrocarbon alpha-olefins, said polymerization product having a molecular weight of about 1000 to 20,000, said amount being sufficient to reduce the pour point of the hydrocarbon fuel oil.

3. The composition of claim 2 wherein the mixture of alpha-olefins contains at least about 60 weight percent of normal $C_{16}$ to $C_{18}$ hydrocarbon alpha-olefins.

4. The composition of claim 3 wherein the mixture of alpha-olefins is selected from normal $C_{12}$ to $C_{20}$ hydrocarbon alpha-olefins, said mixture containing at least about 60 weight percent of and predominating in normal $C_{16}$ hydrocarbon alpha-olefins, said polymerization product having a molecular weight of 1000 to 20,000.

5. The composition of claim 2 wherein the amount of polymer is about 0.1 to 0.5 by weight of the composition.

References Cited by the Examiner

UNITED STATES PATENTS

| 2,379,728 | 7/1945 | Lieber et al. | 44—62 |
| 2,525,788 | 10/1950 | Fontana et al. | 252—59 |
| 2,534,095 | 12/1950 | Young | 252—59 |
| 2,895,915 | 7/1959 | Hewett | 252—59 |
| 2,937,129 | 5/1960 | Garwood | 260—683.15 |

FOREIGN PATENTS

| 676,516 | 6/1952 | Great Britain. |
| 848,777 | 9/1960 | Great Britain. |

DANIEL E. WYMAN, *Primary Examiner.*